UNITED STATES PATENT OFFICE.

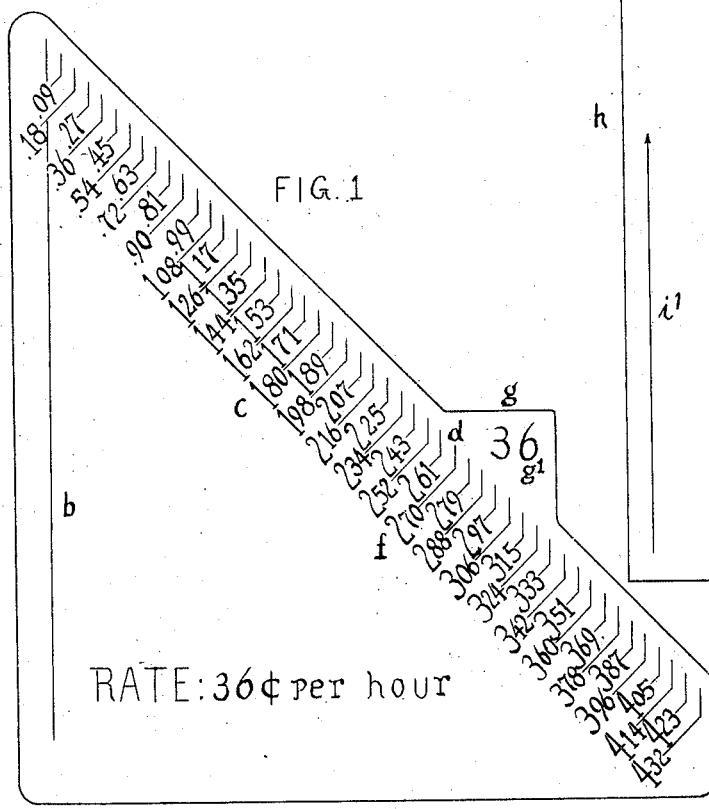
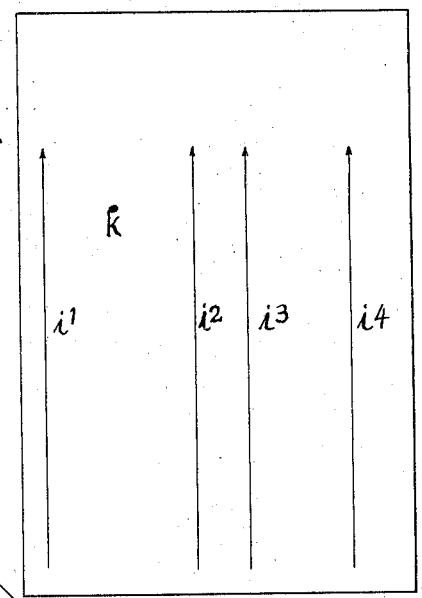
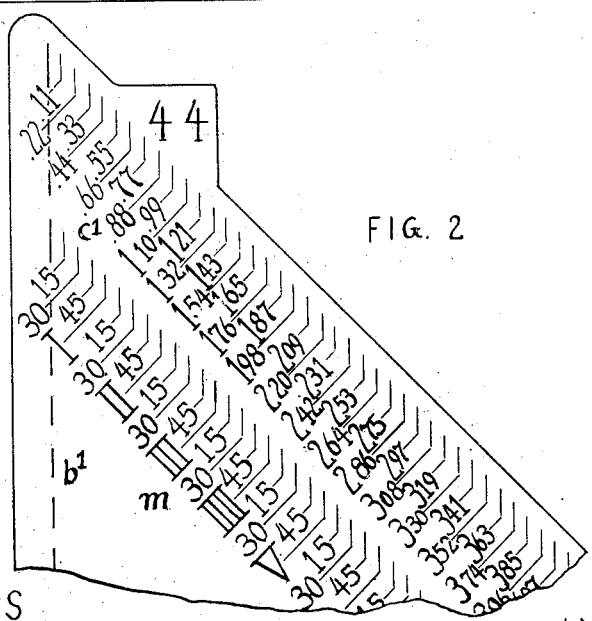

ARTHUR PESTEL, OF NEW YORK, N. Y.

MEASURING DEVICE.

1,248,905. Specification of Letters Patent. Patented Dec. 4, 1917.

Application filed March 5, 1914. Serial No. 822,671.

*To all whom it may concern:*

Be it known that I, ARTHUR PESTEL, a citizen of the United States, and resident of the borough of Manhattan, city, county, and State of New York, have invented a new and useful Measuring Device, of which the following is a specification.

My invention relates to improvements in measuring scales and has for its objects to measure the distance between two or more parallel lines in an accurate manner and in which each of the indices of the scale may be provided with a representative character in a clear and distinguishable manner. A further object of my invention is the provision of a file index when using a number of said measuring devices.

My invention may be adapted for different purposes in accurately measuring the distance between two or more parallel lines, but I desire to especially apply the same in connection with time-cards as being used in factories for cost-keeping purposes, in order to either obtain the length of duration or value in money of a certain period recorded thereon or both of same.

In the accompanying drawings:—Figure 1 is a plan view of a device embodying my invention, Fig. 2 is a broken plan view of a modification of the same, and Fig. 3 a plan view of a time-card drawn on a smaller scale.

Similar characters refer to similar parts.

Referring to Fig. 1, $a$ is a body of any suitable transparent material, having marked thereon a zero mark $b$ and a scale $c$, which is arranged obliquely to the zero mark preferably at an angle of 45°. The indices $d$ are of angular shape, one shank of each index extending in substantial parallelism with the zero mark $b$, while its other shank extends at substantially right angles relatively to the direction of the scale, pointing toward the numerals $f$ arranged at the same angle, in order to have said numerals more easily readable when looking at the measuring device in the position as shown in the drawings, and also to have the same distinguishable, when a line crosses the scale as will be explained later.

It will be seen, that by having the indices forming a right angle on a diagonal, a wider space between said indices is obtained, which permits the numerals $f$ to be of larger size. In order to have the numerals $f$, which on scale $c$ of Fig. 1 represents money values, still larger, they are shown in staggering order.

For the reason, that a number of such measuring devices are to be used, it is convenient to file the same. Therefore a file index $g$ is provided, which has a number $g^1$, designating in this case the rate per hour a workingman receives for his services. The file index $g$ is to occupy a different position on a measuring device having a scale with divisions of different rate per hour.

Referring to Fig. 3, $h$ is a card as being used for time recording purposes, having printed thereon a row of straight and vertically placed lines $i^1$, $i^2$, $i^3$, $i^4$, the distance between each of them representing the period in which a workingman has performed a certain duty. The lines $i^1$, $i^2$, $i^3$, $i^4$ are each printed by means of a time recorder into which said workingman places said time-card at the beginning and end of a period.

To measure the distance $k$ between the lines $i^1$, $i^2$, the measuring device as shown in Fig. 1 is placed on the card $h$ so that the zero mark $b$ will cover the line $i^1$.

At the place, where the line $i^2$ crosses the scale $c$ of the measuring device, the amount due the workingman for that certain period may be read therefrom.

Fig. 2, which is a broken view of a modification of the measuring device shown in Fig. 1, has two scales, $c^1$ and $m$, the former representing values of money and scale $m$ values of time, so that the length of a period as well as its particular value thereof may be readily and distinctly obtained.

In Fig. 2 the rate per hour is shown to be 44 cents. By superimposing Fig. 2 on Fig. 3 in such a way, that line $b^1$ Fig. 2 coincides with line $i^1$ Fig. 3, the lines $i^2$, $i^3$, $i^4$ crossing the scales $c^1$ and $m$ of the measuring device, will indicate at their points of crossing the amounts of time on scale $m$ and the values thereof on scale $c^1$.

For example, $i^2$, one of the lines of Fig. 3, crossing the scale $m$ at the index which indicates hour II, will also cross the scale $c^1$ at the index indicating its value at the rate of 44 cents per hour, showing the amount of 88 cents.

The zero mark $b^1$ is shown in a broken line, so as to facilitate the correct placing of same on one of the lines on card $h$ in Fig. 3.

I prefer to place the zero mark on the measuring device as shown, but it is understood that the side of the device parallel to the zero mark might also be used as such and that therefore, wherever the word zero mark is mentioned, it is meant to imply the broadest meaning possible.

I would have it further understood, that I do not limit my invention to the precise form of the device as shown and that I hold myself at liberty to make such changes and alterations, as fairly fall within the spirit and scope of my invention.

I claim:

A measuring device of the character described, provided with a zero mark, and a measuring scale, said scale being a combination of angular indices, each composed of two shanks, one set of shanks of said indices extending in substantial parallelism with said zero mark, while its other set of shanks extend parallel to each other at an angle to said first set of shanks.

Signed at New York in the county of New York and State of New York this fourth day of March A. D. 1914.

ARTHUR PESTEL.

Witnesses:
W. H. MILHOLLAND,
ARTHUR SWAN.

Copies of this patent may be obtained for five cents each, by addressing the "Commissioner of Patents, Washington, D. C."